(12) United States Patent
Chen

(10) Patent No.: US 7,751,181 B2
(45) Date of Patent: Jul. 6, 2010

(54) BATTERY COVER ASSEMBLY FOR PORTABLE ELECTRONIC DEVICE

(75) Inventor: Yong Chen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 92 days.

(21) Appl. No.: 12/254,088

(22) Filed: Oct. 20, 2008

(65) Prior Publication Data

US 2010/0020477 A1  Jan. 28, 2010

(30) Foreign Application Priority Data

Jul. 25, 2008 (CN) .................. 2008 1 0303076

(51) Int. Cl.
*G06F 1/16* (2006.01)
(52) U.S. Cl. .................. 361/679.01; 429/97; 429/100; 455/128
(58) Field of Classification Search ............ 361/679.01; 429/163, 97, 100; 455/128
See application file for complete search history.

(56) References Cited

U.S. PATENT DOCUMENTS

| | | | | |
|---|---|---|---|---|
| 5,905,632 | A * | 5/1999 | Seto et al. ............... | 361/679.55 |
| 6,436,569 | B1 * | 8/2002 | Dijkstra et al. ............ | 429/97 |
| 6,929,878 | B2 * | 8/2005 | Chen et al. .............. | 429/100 |
| 7,068,495 | B2 * | 6/2006 | Luo et al. ............... | 361/679.56 |
| 7,136,291 | B2 * | 11/2006 | Tu et al. ................. | 361/797 |
| 7,180,754 | B2 * | 2/2007 | Qin et al. ................ | 361/797 |
| 7,303,424 | B2 * | 12/2007 | Tu et al. ................. | 439/372 |
| 7,309,253 | B2 * | 12/2007 | Ge et al. ................. | 439/500 |
| 7,419,742 | B2 * | 9/2008 | Liu et al. ................ | 429/97 |
| 7,442,464 | B2 * | 10/2008 | Li ....................... | 429/97 |
| 7,495,899 | B2 * | 2/2009 | Liu et al. ............... | 361/679.28 |
| 7,512,397 | B2 * | 3/2009 | Liu et al. ............... | 455/347 |
| 7,542,789 | B2 * | 6/2009 | Liu et al. ............... | 455/575.8 |
| 7,550,226 | B2 * | 6/2009 | Qin et al. ................ | 429/100 |
| 7,629,074 | B2 * | 12/2009 | Li et al. ................. | 429/97 |
| 2006/0141344 | A1 * | 6/2006 | Chen et al. .............. | 429/97 |
| 2006/0154136 | A1 * | 7/2006 | Ge et al. ................. | 429/97 |
| 2006/0166083 | A1 * | 7/2006 | Zhang et al. ............. | 429/97 |
| 2006/0279252 | A1 * | 12/2006 | Zuo et al. ............... | 320/107 |
| 2007/0015477 | A1 * | 1/2007 | Tu et al. ................. | 455/128 |
| 2007/0122693 | A1 * | 5/2007 | Qin et al. ................ | 429/97 |
| 2007/0166608 | A1 * | 7/2007 | Tu et al. ................. | 429/97 |
| 2007/0190829 | A1 * | 8/2007 | Tu et al. ................. | 439/136 |
| 2007/0218961 | A1 * | 9/2007 | Luo et al. ............... | 455/575.1 |
| 2008/0042448 | A1 * | 2/2008 | Ge et al. ................. | 292/137 |
| 2010/0009247 | A1 * | 1/2010 | Shi ...................... | 429/100 |
| 2010/0014221 | A1 * | 1/2010 | Shi ...................... | 361/679.01 |

* cited by examiner

*Primary Examiner*—Lisa Lea-Edmonds
(74) *Attorney, Agent, or Firm*—Steven M. Reiss

(57) ABSTRACT

A battery cover assembly for a portable electronic device (100), the battery cover assembly includes a cover (10), a housing (30) and a button mechanism (20). The cover defines a button hole (12). The housing defines a first stopper groove (345) and a second stopper groove (365). The button mechanism includes a slidable element (22), a latching element (24) and a swinging element (26). The slidable element includes an operation portion (2224) and a fixed portion (226). The operation portion is slidably received in the button hole, and the fixed portion is releasably locked in the first stopper groove. The latching element includes an extending portion (244) releasably locked in the second stopper groove. The swinging element connects the slidable element to the latching element.

16 Claims, 5 Drawing Sheets

BATTERY COVER ASSEMBLY FOR PORTABLE ELECTRONIC DEVICE

BACKGROUND

1. Field of the Invention

The present invention generally relates to battery cover assemblies and, particularly, to a battery cover assembly for use in a portable electronic device.

2. Description of Related Art

Batteries are widely used in portable electronic devices, such as personal digital assistants (PDAs) and mobile phones. Conventional batteries are attachably received in the electronic device, and battery covers are designed to connect with housings of the electronic devices to enclose the batteries. The batteries have to be replaced by opening the battery covers when, for example, the batteries are damaged and/or dead (i.e. no longer rechargeable).

Although battery cover assemblies may be simple, the engagement between the battery cover and the housing of the mobile phone can be too firm to allow easy disengagement.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION OF THE EMBODIMENTS

Figure 1:
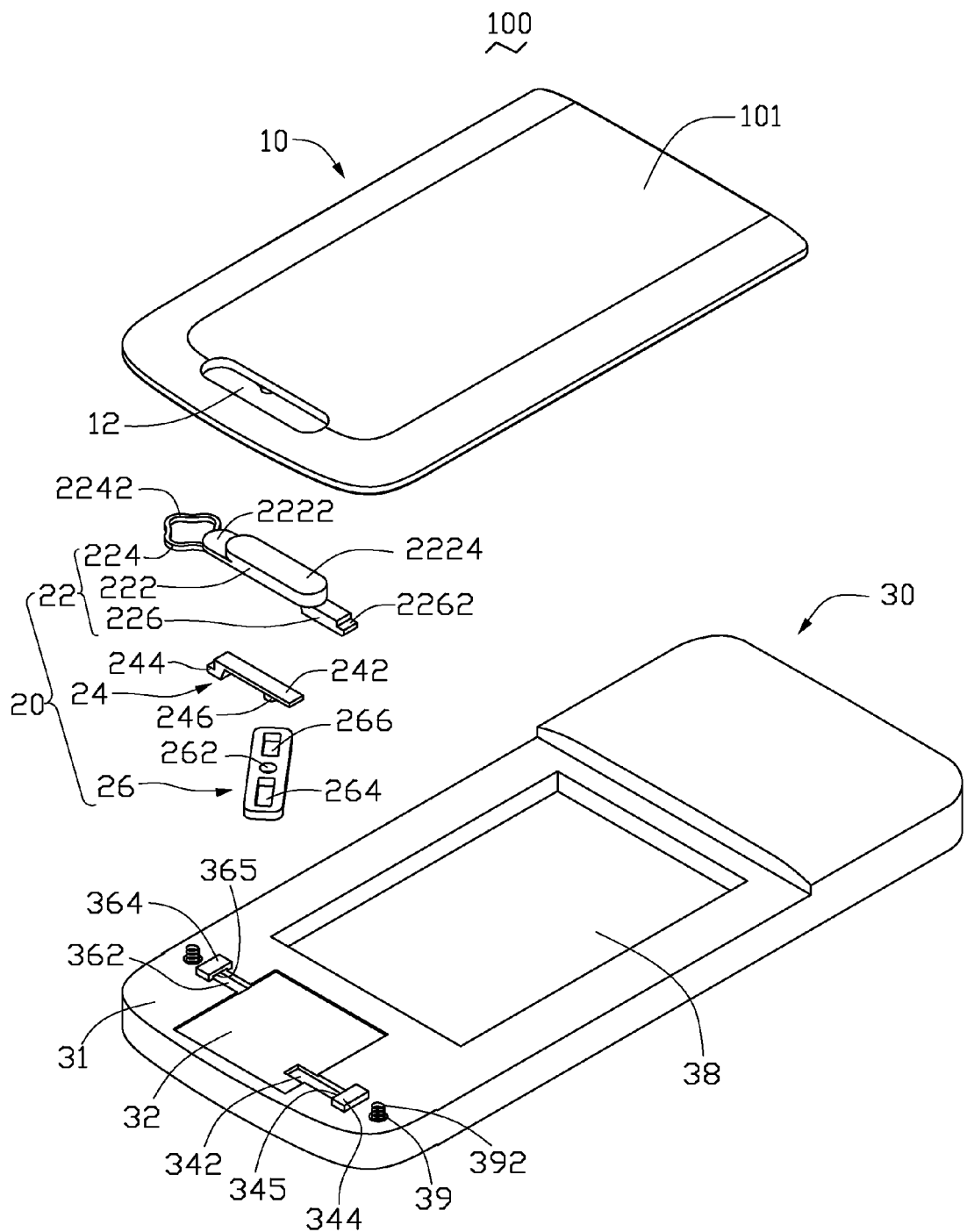
FIG. 1 is an exploded, isometric view of a portable electronic device using a battery cover assembly in accordance with an exemplary embodiment.
Figure 2:
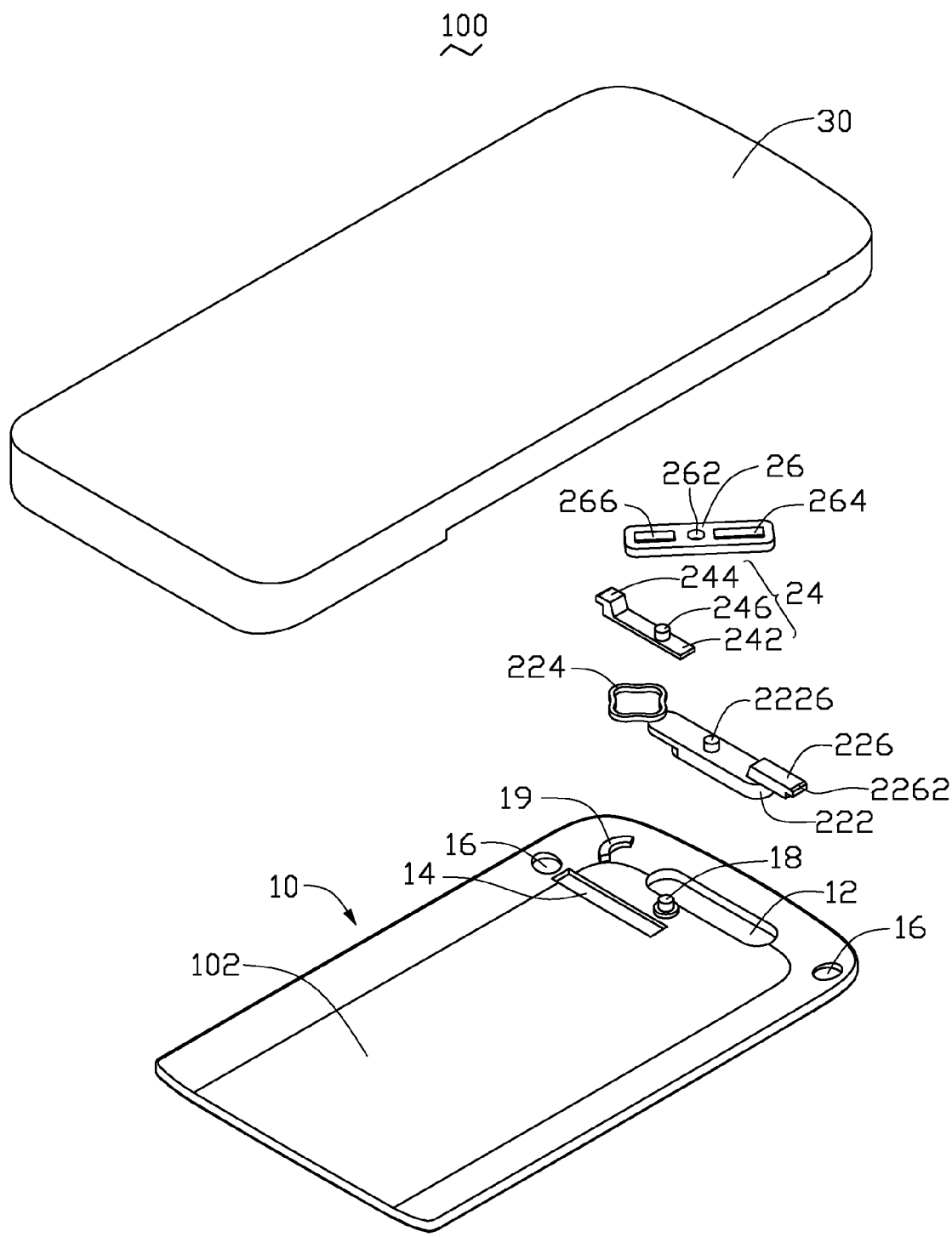
FIG. 2 is similar to FIG. 1, but viewed from another aspect.
Figure 3:
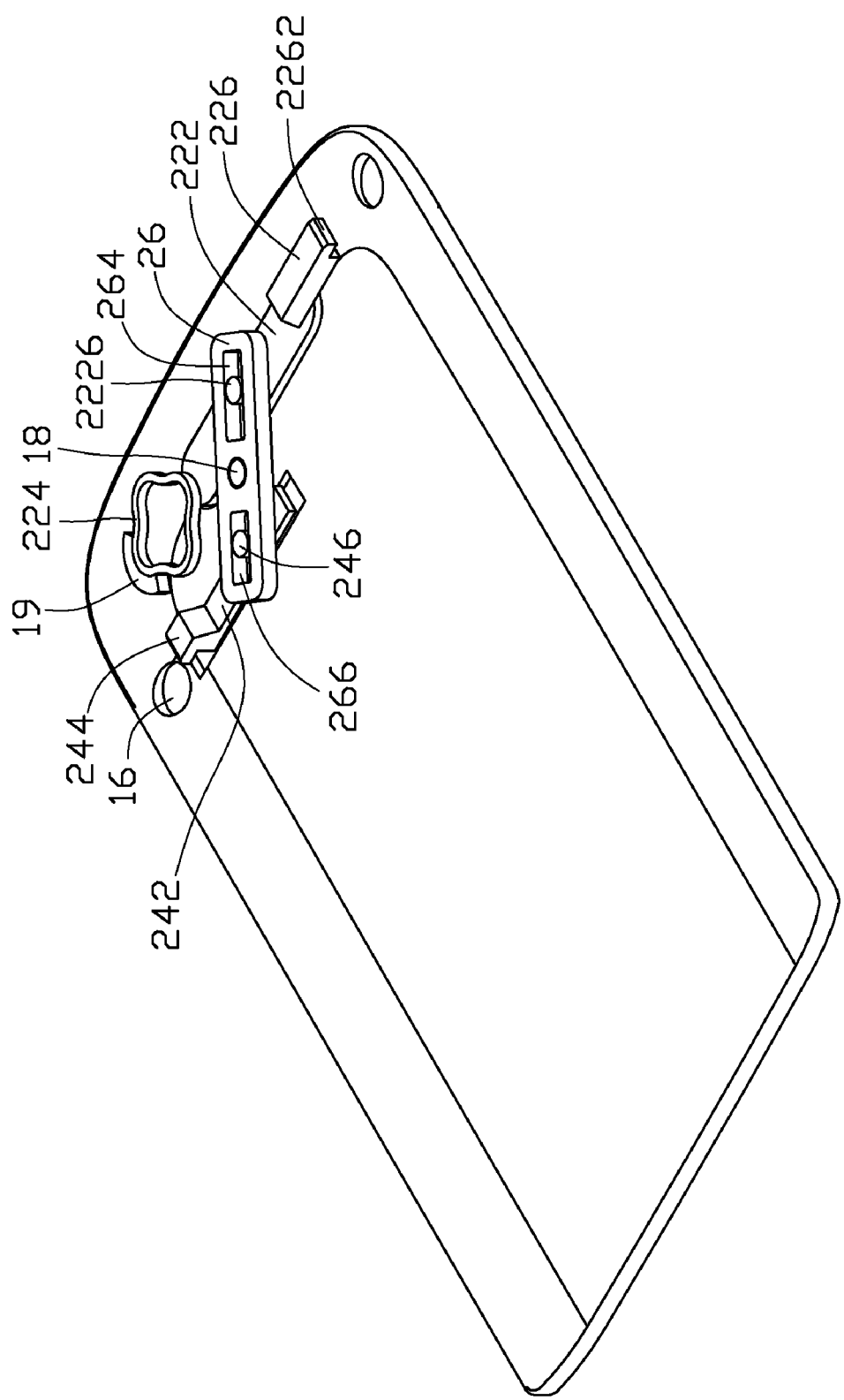
FIG. 3 is a front assembled view of the portable electronic device shown in FIG. 1.

FIGS. 1 and 2 show a portable electronic device 100 such as a mobile phone having a battery cover assembly. The mobile phone 100 is an exemplary application, for the purposes of describing details of a battery cover assembly of the exemplary embodiment. The battery cover assembly incorporates a battery cover 10, a button mechanism 20, and a housing 30. The button mechanism 20 is configured for releasably latching (i.e. attaching, locking, engaging) the battery cover 10 to the housing 30.

The cover 10 includes a top surface 101 and a bottom surface 102 and defines a button hole 12. The bottom surface 102 of the cover 10 defines a rectangular groove 14 adjacent to the button hole 12. The groove 14 is parallel to, but transversely opposite from, the button hole 12. The bottom surface 102 forms a post 18 between the button hole 12 and the groove 14. Each side of the bottom surface 102 defines a containing groove 16. A block 19, preferably arcuate, is formed in the bottom surface 102 adjacent to the button hole 12.

The housing 30 defines a cavity 38 for receiving a battery (not shown). The housing 30 has a latching end 31 at the end thereof adjacent to the cavity 38. The latching end 31 defines a rectangular receiving groove 32, a first slot 342 and a second slot 362. The first slot 342 and the second slot 362 are at two sides of, and communicate with, the receiving groove 32. A first protrusion 344 covers one end of the first slot 342 to define a first stopper groove 345. A second protrusion 364 covers one end of the second slot 362 to define a second stopper groove 365. A depth of the first slot 342 and the second slot 362 are deeper than the receiving groove 32. Two receiving holes 39 are respectively defined in the housing 30 adjacent to the first protrusion 344 and the second protrusion 364. The two receiving holes 39 correspond to the containing grooves 16 of the cover 10. Two springs 392 are fixedly received in the receiving holes 39.

The button mechanism 20 includes a slidable element 22, a latching element 24 and a swinging element 26.

The slidable element 22 includes a main body 222, an elastic portion 224 and a fixed portion 226. The main body 222 includes a board portion 2222 and an operation portion 2224 formed on the board portion 2222. One end of the board portion 2222 is coplanar with the operation portion 2224, the other end thereof is longer than the operation portion 2224. A length of the operation portion 2224 is smaller than the button hole 12 for allowing the operation portion 2224 to be slidably received in the button hole 12. A shaft 2226 is formed on the board portion 2222 opposite to the operation portion 2224. The elastic portion 224 is formed at one end of the board portion 2222. The elastic portion 224 is made of rubber material, and is substantially a closed ring. The elastic portion 224 includes four bent portions 2242. Each bent portion 2242 is arcuate. One of the bent portions 2242 is attached to the board portion 2222 by e.g. melting. One end of the fixed portion 226 is attached to the board portion 2222 opposite to the elastic portion 224 by e.g. melting. The fixed portion 226 has a stepped end 2262 at a distal end thereof.

The latching element 24 includes a base 242 and an extending portion 244. The base 242 is slidably received in the sliding groove 14. The extending portion 244 is formed at one end of the base 242. A cylinder 246 is formed in the base 242.

The swinging element 26 is substantially a board, and is for engaging the receiving groove 32. The swinging element 26 defines a fixed hole 262 at a central area thereof. Two guide holes 264, 266 are defined at two sides of the fixed hole 262.

Figure 4:
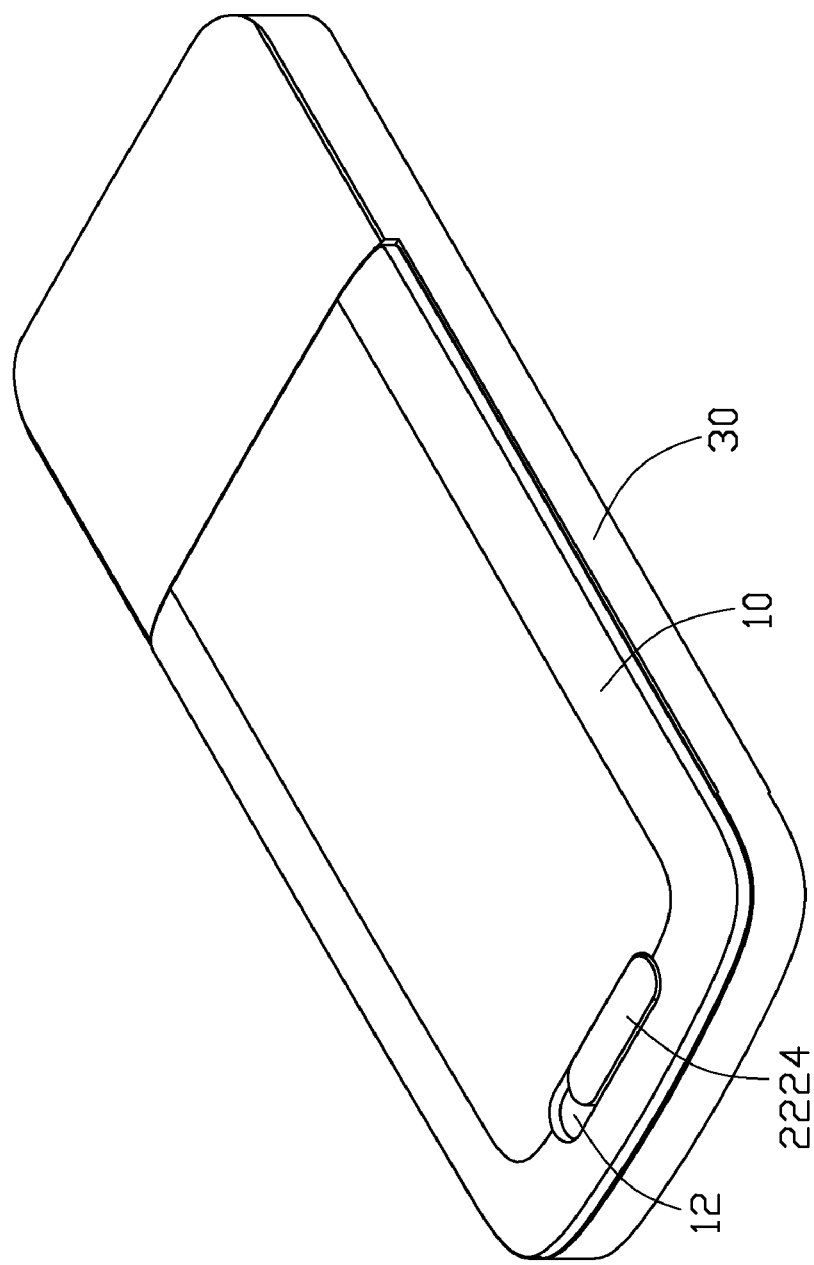
FIG. 4 is a back assembled view of FIG. 3.
Figure 5:
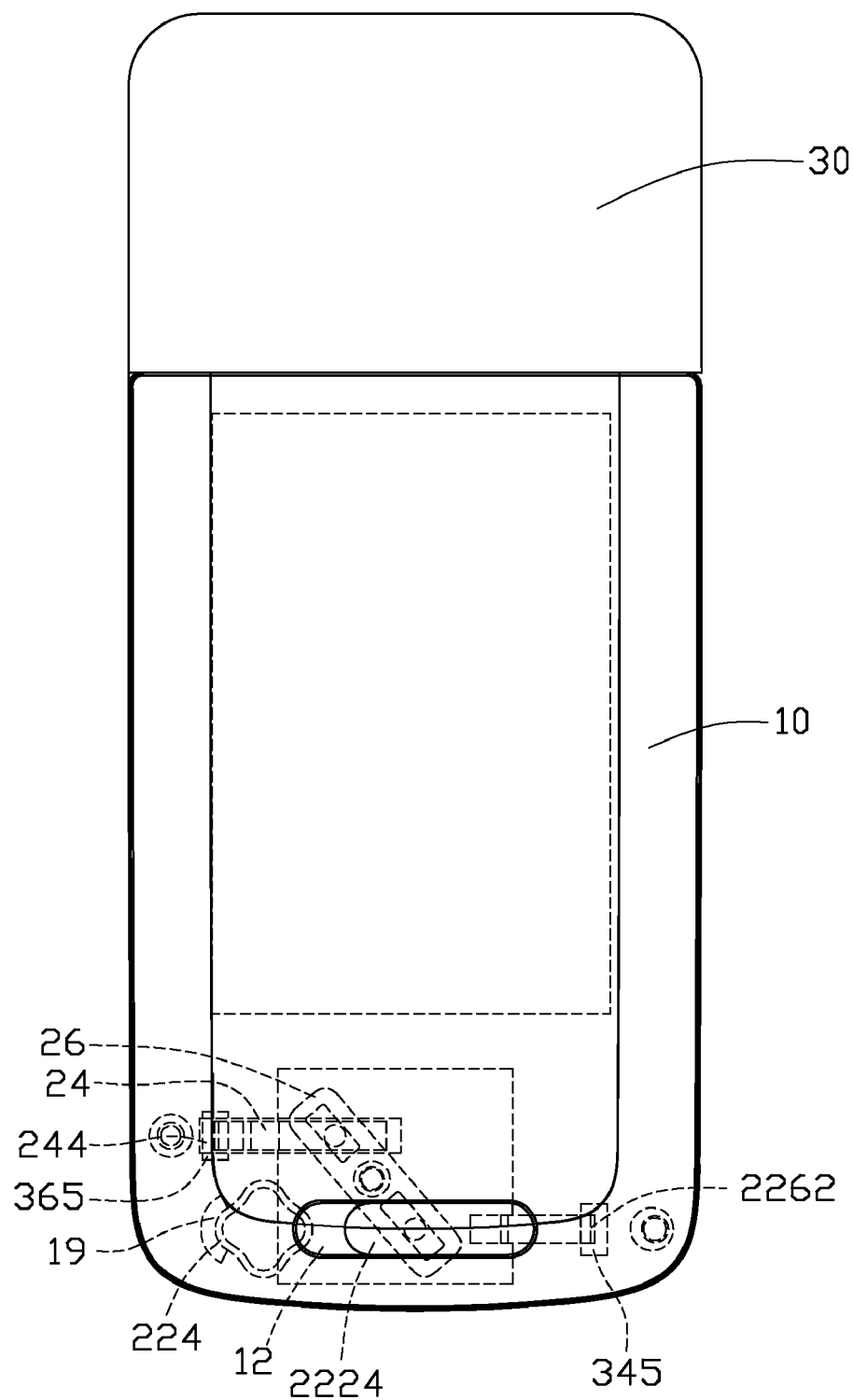
FIG. 5 is a work state view of the portable electronic device of FIG. 1.

During assembly of the battery cover assembly, referring to FIGS. 4 and 5, firstly, the operation portion 2224 of the slidable element 22 is received in the button hole 12 from the bottom surface 102 of the cover 10. The elastic portion 224 resists the block 19. Then, the base 242 of the latching element 24 is received in the groove 14. The extending portion 244 and the cylinder 246 extending from the sliding groove 14. The swinging element 26 is positioned on the slidable element 22 and the latching element 24. The fixed hole 262 is rotatably locked to the post 18. At the same time, the guide hole 264 receives the shaft 2226, and the guide hole 266 receives the cylinder 246. Since the swinging element 26 is rotatably fixed to the cover 10, the slidable element 22 and the latching element 24 will not separate from the cover 10. Therefore, the button mechanism 20 is attached to the cover 10.

To close the cover 10, the operation portion 2224 of the slidable element 22 is pushed to slide within the button hole 12. Accordingly, the swinging element 26 slides the fixed portion 226 and the extending portion 244. The bent portion 2242 of the elastic portion 224 is compressed against block 19 to accumulate elastic energy. The cover 10 with the button mechanism 20 is placed over the cavity 38 of the housing 30. The springs 392 are respectively received in the containing grooves 16. The fixed portion 226 is received in the first slot 342, and the latching element 24 is received in the second slot 362. The swinging element 26 is received in the receiving groove 32. The operation portion 2224 is then released. And the elastic portion 224 expands back to its normal shape, releasing the accumulated elastic energy. The board portion 2222 slides until the stepped end 2262 of the fixed portion 226 is locked in the first stopper groove 345, and the latching element 24 slides in the groove 14 until the extending portion 244 is locked in the second stopper groove 365. Therefore, the cover 10 is locked to the housing 30.

Referring to FIG. 5, to open the cover 10, the operation portion 2224 is pushed to slide from one side of groove 14 to the other. The stepper end 2262 slides out from the first stopper groove 345. The shaft 2226 slides in the guide hole 264 to cause the swinging element 26 to rotate in the receiving groove 32. Accordingly, the cylinder 246 slides in the guide hole 266 to cause the extending portion 244 to separate from the second stopper groove 365. The cover 10 is unlocked with the housing 30. The cover 10 is pushed out by the springs 39.

As described above, the exemplary embodiment provides a battery cover assembly for portable electronic devices, such as mobile phones. When the button is pushed to slide, the cover of the battery cover assembly can easily open, making the operation of the device more user-friendly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for a portable electronic device, the battery cover assembly comprising:
   a cover defining a button hole;
   a housing defining a first stopper groove and a second stopper groove;
   a button mechanism comprising:
      a slidable element including an operation portion and a fixed portion, the operation portion slidably received in the button hole, the fixed portion for releasably locking within the first stopper groove;
      a latching element including an extending portion for releasably locking within the second stopper groove; and
      a swinging element connecting the slidable element to the latching element.

2. The battery cover assembly as claimed in claim 1, wherein the slidable element further includes a main body and an elastic portion, the operation portion is part of the main body, the fixed portion is formed at one end of the main body, and the elastic portion is formed at the other end of the main body.

3. The battery cover assembly as claimed in claim 2, wherein the elastic portion includes four bent portions, each bent portion is arcuate, and the cover forms a block adjacent to the button hole for resisting a corresponding bent portion.

4. The battery cover assembly as claimed in claim 3, wherein the block is arcuate.

5. The battery cover assembly as claimed in claim 1, wherein the cover defines a groove, the latching element includes a base, the extending portion extends from one end of the base, and the base is received in the groove.

6. The battery cover assembly as claimed in claim 1, wherein the cover forms a post, the swinging element defines a fixed hole for rotatably receiving the post.

7. The battery cover assembly as claimed in claim 6, wherein the swinging element defines a guide holes at each side of the fixed hole, the slidable element forms a shaft opposite to the operation portion and engaging in one guide hole, and the latching element forms a cylinder engaging in the other guide hole.

8. The battery cover assembly as claimed in claim 1, wherein the housing defines a receiving groove between the first stopper groove and the second stopper groove to receive the swinging element.

9. The battery cover assembly as claimed in claim 8, wherein the housing defines a first slot and a second slot at two sides of the receiving groove, a first protrusion covers one end of the first slot to define the first stopper groove, a second protrusion covers one end of the second slot to define the second stopper groove.

10. The battery cover assembly as claimed in claim 1, wherein the cover defines two containing grooves, the housing defines two receiving holes, two springs are respectively receiving the containing grooves and the receiving holes.

11. A portable electronic device comprising:
    a cover defining a button hole;
    a housing defining a first stopper groove and a second stopper groove;
    a button mechanism comprising:
       a slidable element including an operation portion, the operation portion slidably received in the button hole, the slidable element for releasably locking in the first stopper groove;
       a latching element for releasably locking in the second stopper groove; and
       a swinging element connecting the slidable element to the latching element;
    wherein the operation portion slides in the button hole to release the slidable element from the first stopper groove, and the swinging element rotates to release the latching element from the second stopper groove.

12. The portable electronic device as claimed in claim 11, wherein the cover forms a post, the swinging element defines a fixed hole for rotatably receiving the post.

13. The portable electronic device as claimed in claim 12, wherein the swinging element defines a guide hole at each side of the fixed hole, the slidable element forms a shaft opposite to the operation portion and engaging in one guide hole, and the latching element forms a cylinder engaging in the other guide hole.

14. The portable electronic device as claimed in claim 11, wherein the slidable element includes a main body, an elastic portion and a fixed portion, the operation portion is formed in the main body, the fixed portion is formed at one end of the main body, and the elastic portion is formed at the other end of the main body.

15. The portable electronic device as claimed in claim 14, wherein the elastic portion includes four bent portions, each bent portion is arcuate, and the cover forms an block adjacent to the button hole for resisting a corresponding bent portion.

16. The battery cover assembly as claimed in claim 15, wherein the block is arcuate.

* * * * *